United States Patent [19]

Simon et al.

[11] Patent Number: 5,668,242

[45] Date of Patent: Sep. 16, 1997

[54] POLYESTERS FOR THE BONDING OF TEXTILES

[75] Inventors: Ulrich Simon, Herne; Siegfried Hahn, Hennef-Stossdorf, both of Germany

[73] Assignee: Huels Aktiengesellschaft, Marl, Germany

[21] Appl. No.: 617,594

[22] Filed: Mar. 19, 1996

[30] Foreign Application Priority Data

Mar. 22, 1995 [DE] Germany .................. 195 10 314.9

[51] Int. Cl.[6] ............................................ C08G 63/02
[52] U.S. Cl. ...................... 528/272; 156/327; 528/176; 528/274
[58] Field of Search .................. 528/176, 272, 528/274; 156/327

[56] References Cited

FOREIGN PATENT DOCUMENTS

| 2705270 | 8/1978 | Germany . |
|---|---|---|
| 54-153835 | 4/1979 | Japan . |

*Primary Examiner*—Terressa Mosley
*Attorney, Agent, or Firm*—Oblon, Spivak, McClelland, Maier & Neustadt, P.C.

[57] ABSTRACT

Polyether esters are employed for the adhesive bonding of textiles since they are resistant to washing and dry cleaning. The polyether esters of the prior art have the disadvantage that they often exhibit poor adhesion with critical outer materials such as, for example, silk. By means of the polyether esters according to the invention, it is possible to bond sensitive textiles effectively at very low temperatures.

7 Claims, No Drawings

POLYESTERS FOR THE BONDING OF TEXTILES

BACKGROUND OF THE INVENTION

Field of the Invention

The invention relates to polyether esters for the adhesive bonding of textiles, based on terephthalic acid, isophthalic acid, 1,4-butanediol and a polyalkylene ether diol.

For the adhesive bonding of textile substrates, for example of interlining with outer materials, with the aim of achieving a stiffening effect, polymers are used which in most cases are applied—in finely divided form as powders or from a melt—in a regular arrangement to the inner face of one of the textiles to be bonded, then are partially melted by the action of heat and are thereby caused to undergo partial sintering, after which the outer material to be stiffened is ironed on by renewed application of heat under pressure in hot presses.

A number of different copolyesters have already been disclosed as polymers for use as textile hot-pressing powders. These polyesters are of inadequate stability to the effect of organic solvents as are used in the dry cleaning of textiles, insofar as the polyesters contain exclusively radicals of low molecular weight dicarboxylic acids and dialcohols.

Polyesters having such compositions, and their use as textile adhesives, have been described in various references (U.S. Pat. No. 3,669,921, DE-A 19 20 432, U.S. Pat. No. 3,948,859, DE-A 30 37 100 and DE-A 24 35 863). These polyesters are used predominantly for textiles which are usually cleaned only by washing, examples of their use being the stiffening of collars, cuffs and blouses. In order to obtain textile bonds which are resistant both to washing and to dry cleaning, the use of block copolyether esters has been described. For instance (JP-A 54-153 835), as textile adhesive, a polyether ester is recommended which contains a) from 70 to 40 mol % of terephthalic acid radicals, b) from 30 to 60 mol % of isophthalic acid radicals, c) 1,4-butanediol radicals, and d) from 1 to 10% by weight (based on the sum of a) to d)) of radicals of a polyalkylene ether diol having a molar mass of from 0.3 to 6 kg/mol, all incorporated by cocondensation; component d) includes polyethylene glycol, although polytetramethylene glycol is preferred. As a result of the low concentration of component d), such polyesters have a comparatively high melt viscosity, so that relatively high hot-pressing temperatures and/or long ironing-in times or high pressing forces are necessary to produce the adhesive bonds. Thus materials which are relatively temperature-sensitive can under certain circumstances be damaged in this process.

It has also already been disclosed to retain constituents a) to c) and to raise the concentration of constituent d) to from 10 to 33% by weight (calculated as above), constituent d) denoting a radical of polytetramethylene glycol with a molar mass of from 0.6 to 1.3 kg/mol (DE-A 27 05 270). The exclusive use of polytetramethylene glycol when using heightened concentrations of constituent d) is based on the fact that, in increased concentrations, polyethylene glycol increases the sensitivity of such block polyesters to water and impairs the resistance to washing of textile bonds prepared from such polyesters. For instance (DE-A 24 51 369), for mixtures of block polyether esters with dianhydrides and their use for the adhesive bonding of smooth-surface substrates, it has been described that long-chain polyalkylene ether diols incorporated by condensation as soft segments, with a molar ratio of carbon to oxygen of more than about 2.5:1, led in general to block polyesters which showed little swelling in water and were resistant to hydrolysis. Where, therefore, the factor of sensitivity to water is important in terms of the intended use, as in the case of the textile-adhesive polyesters, then it was expedient not to use polyethylene glycol, or at most (JP-A 54-153 835) to use it in low concentrations.

DE-C 31 32 059 describes a polyether ester for the adhesive bonding of textiles, based on terephthalic acid, isophthalic acid, 1,4-butanediol and a polyalkylene ether diol. The molar ratio of terephthalic acid to isophthalic acid in this ester is from 48 to 55:from 52 to 45.

Owing to the high proportion of terephthalic acid, the polyester is highly crystalline, which always leads to problems with adhesion, and has a high melting point, which contradicts the recent trend in bonding. It has been found that, by lowering the proportion of terephthalic acid to from 42 to 45 mol % while raising that of isophthalic acid to from 55 to 58%, it was possible to reduce the crystallinity and the melting point.

The object of the invention was therefore to find a polyether ester which does not have the abovementioned disadvantages. Surprisingly it has now been found that a polyether ester based on terephthalic acid, isophthalic acid, 1,4-butanediol and a polyalkylene ether diol, characterized in that the molar ratio of terephthalic acid to isophthalic acid is from 35 to 50:from 65 to 50, in particular from 42 to 47:from 58 to 53, and polyethylene glycol is employed in a proportion of from 10.5 to 25% by weight and with a molecular mass of from 0.4 to 6 kg/mol, based on the sum of all of the radicals present in the polyether ester, meets these requirements. The molar ratio of terephthalic acid to isophthalic acid is preferably 42:58 and 45:55.

Up to 20 mol % of the isophthalic acid or terephthalic acid employed can be replaced by adipic acid and/or another saturated dicarboxylic acid of 6 to 12 carbon atoms.

Highly surprisingly it has now been found that products with such high proportions of isophthalic acid in conjunction with polyethylene glycol can be processed and milled without problems, which appeared impossible on the basis of knowledge gained to date. Furthermore, melting points lower by almost 20° C. were found (DSC; from 103° to 108° C.), which comes closer to the recent trend in bonding. Combined with this is a substantially higher degree of adhesion to critical outer materials. In spite of this it has been possible to achieve a large reduction in back-sticking.

Up to 20 mol % of the 1,4-butanediol, preferably from 5 to 10 mol %, can be replaced by hexanediol.

Up to 10% by weight of the polyethylene glycol used can be replaced by di- or triethylene glycol or by low molecular weight alkylene ether diols.

As is known, polyethylene glycol imparts to polyether esters prepared therefrom a particularly high level of susceptibility to thermal oxidation, which is why stabilizers should expediently be used in the preparation of the polyether ester (H. Zimmermann, K. Dietrich, Acta Polym. 1979, 30(4) 199–203).

In practice, further additives such as nucleating agents, for example micronized talc, antistatics, lubricants or waxes as milling assistants, are added either directly to the polyether ester melts, or during or after the milling of the polyether esters.

The polyether esters are prepared in principle by the customary melt condensation processes, as are described, for example, in DE-C 31 32 059.

EXAMPLES

The polyether esters used had the following composition:

Example 1

42 mol % of terephthalic acid
58 mol % of isophthalic acid
100 mol % of 1,4-butanediol
+11% by weight of polyethylene glycol, based on the sum of all of the constituents present in the polyester

Example 2

45 mol % of terephthalic acid
55 mol % of isophthalic acid
100 mol % of 1,4-butanediol
+11% by weight of polyethylene glycol, based on the sum of all of the constituents present in the polyester

Comparison Example (DE-C 31 32 059)

50 mol % of terephthalic acid
50 mol % of isophthalic acid
100 mol % of 1,4-butanediol
+11% by weight of polyethylene glycol, based on the sum of all of the constituents present in the polyester The polyether esters are prepared in principle by the customary melt condensation processes. A typical polyether ester according to the invention was prepared as follows:

8.2 kg of dimethyl terephthalate (42 mol), 10.8 kg of 1,4-butanediol (120 mol), 2.7 kg of polyethylene glycol (corresponding to 11% by weight, based on the polyester theoretically produced), 25 g of tetrabutyl titanate and 43 g of 2-ethyl-1,2-hexanediol were placed in a 40 l stainless steel reactor.

After displacement of the air by nitrogen, the reactor as heated under atmospheric pressure then, at an internal temperature of 120° to 130° C., the stirrer mechanism was switched on and 3.1 l of distillate (essentially methanol) were removed with a column-head temperature of 62° to 67° C. up to a final temperature of 180° C. By-passing the column, a further 0.7 l of distillate was obtained. The mixture was then cooled to 160° C., 10.1 kg of isophthalic acid (58 mol) were added against a strong stream of nitrogen, the temperature was set at from 190° to 200° C., and 2 l of distillate (essentially water) were stripped off via the column. Subsequently, 13.5 g of Irganox 1010® were added, and the temperature was raised to from 240° to 245° C. while applying a vacuum. The mixture was stirred at 245° C. under a pressure of below $1.3 \cdot 10^{-3}$ bar until the increase in the resistance to stirring indicated a preset, empirically determined value. The vacuum was then removed by nitrogen, and the melt was drained off, left to solidify and comminuted.

Examples

The copolyesters were mixed with a conventional paste base and applied via a screen-printing stencil of 25 mesh to a conventional 20 g/m² nylon nonwoven, dried and sintered. They were then bonded to the two outer materials from the second table below, and the adhesion was measured subsequently.

| Paste base: | |
|---|---|
| water | 1800 g |
| Mirox HP | 40 g |
| Intrasol 12/18/5 | 60 g |
| Tegopren 5847 | 10 g |
| Unimoll 66 | 80 g |
| Vestamelt X1151-P1 | 600 g |
| Mirox OX | 100 g |

| | mol % Tere | mol % Iso | % by wt. PEG 4000 | mol % 1,4 butanediol | VIN DIN 53728 cm³/g | M.p. [°C.] ring + ball | OT [sec] | M.p. [°C.] DSC |
|---|---|---|---|---|---|---|---|---|
| Comparison example | 50 | 50 | 11 | 100 | 85 | 138 | 20" | 124 |
| Example 1 | 42 | 58 | 11 | 100 | 94 | 121 | 20" | 103 |
| Example 2 | 45 | 55 | 11 | 100 | 79 | 128 | 20" | 108 |

PEG 4000 = polyethylene glycol of molecular weight 4000
OT = open time

| Test | Example 1 | Example 2 | Comparison example |
|---|---|---|---|
| Tendency to stick to roller | 1.75N/5 cm | 0.1N/5 cm | 5N/5 cm |
| Back-sticking | 1.5N/10 cm | 0.5N/10 cm | 4N/10 cm |
| Separating force: primary (on PES viscose georgette) after dry cleaning | 4 6 | 3 6 | 3 4 |
| Separating force: primary (on cotton poplin) after washing at 40° C. | 8 8 | 8 9.5 | 4 4.5 |

Bonding conditions:
Temperature at point of join: 120° C.
Bonding time: 10 s
Pressing force: 3.5N It was found that Examples 1 and 2 are superior in all respects to the comparison example, with the resistance of the example to washing being particularly outstanding.

What is claimed as new and desired to be secured by Letters Patent of the United States is:

1. A polyether ester for the adhesive bonding of textiles, obtained by reacting terephthalic acid, isophthalic acid, 1,4-butanediol and a polyethylene glycol, wherein the molar ratio of terephthalic acid to isophthalic acid is from 35 to 50 parts terephthalic acid:from 65 to 50 parts isophthalic acid, and the polyethylene glycol is employed in a proportion of from 10.5 to 25% by weight and with a molecular mass of from 0.4 to 6 kg/mol, based on the sum of all of the radicals present in the polyether ester.

2. The polyether ester according to claim 1, wherein the molar ratio of terephthalic acid to isophthalic acid is 42:58 or 45:55.

3. The polyether ester according to claim 1, wherein up to 20 mol % of the 1,4-butanediol is replaced by hexanediol.

4. The polyether ester according to claim 1, wherein from 5 to 10 mol % of the 1,4-butanediol is replaced by hexanediol.

5. The polyether ester according to claim 1, wherein up to 10% by weight of the polyethylene glycol is replaced by di- or triethylene glycol.

6. The polyether ester according to claim 1, wherein up to 20 mol % of the isophthalic acid or terephthalic acid employed is replaced by adipic acid, another saturated dicarboxylic acid of 6 to 12 carbon atoms, or a mixture thereof.

7. The polyether ester according to claim 1, wherein the molar ratio of terephthalic acid to isophthalic acid is from 42 to 47 parts terephthalic acid:from 58 to 53 parts isophthalic acid.

* * * * *